(12) United States Patent
Kang et al.

(10) Patent No.: US 12,191,080 B2
(45) Date of Patent: Jan. 7, 2025

(54) MULTILAYER CERAMIC ELECTRONIC COMPONENT

(71) Applicant: SAMSUNG ELECTRO-MECHANICS CO., LTD., Suwon-si (KR)

(72) Inventors: Woong Gi Kang, Suwon-si (KR); Hyung Joon Jeon, Suwon-si (KR); Ji Seop Oh, Suwon-si (KR); Jeong Ryeol Kim, Suwon-si (KR); Eun Jung Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 255 days.

(21) Appl. No.: 17/983,850

(22) Filed: Nov. 9, 2022

(65) Prior Publication Data
US 2023/0207194 A1  Jun. 29, 2023

(30) Foreign Application Priority Data
Dec. 27, 2021 (KR) .......... 10-2021-0188004

(51) Int. Cl.
*H01G 4/005* (2006.01)
*H01G 4/10* (2006.01)
*H01G 4/30* (2006.01)

(52) U.S. Cl.
CPC .............. *H01G 4/005* (2013.01); *H01G 4/10* (2013.01); *H01G 4/30* (2013.01)

(58) Field of Classification Search
CPC  H01G 4/005; H01G 4/10; H01G 4/30; H01G 4/32
See application file for complete search history.

(56) References Cited

U.S. PATENT DOCUMENTS

| | | | |
|---|---|---|---|
| 2006/0223692 A1 | 10/2006 | Ito et al. | |
| 2015/0103467 A1* | 4/2015 | Okamoto | H01G 4/30 29/25.42 |
| 2016/0020025 A1* | 1/2016 | Yao | C04B 35/62685 361/301.4 |
| 2016/0111213 A1* | 4/2016 | Okamoto | C04B 35/638 361/301.4 |
| 2016/0118188 A1* | 4/2016 | Wada | C04B 35/4682 29/25.42 |
| 2016/0358711 A1* | 12/2016 | Oguni | H01G 4/1227 |
| 2019/0148042 A1* | 5/2019 | Yun | H01G 4/1281 361/275.3 |
| 2020/0043661 A1 | 2/2020 | Kwon et al. | |

(Continued)

FOREIGN PATENT DOCUMENTS

| | | |
|---|---|---|
| JP | H11-240753 A | 9/1999 |
| JP | 2012-056840 A | 3/2012 |

(Continued)

*Primary Examiner* — Michael P McFadden
(74) *Attorney, Agent, or Firm* — MORGAN, LEWIS & BOCKIUS LLP

(57) ABSTRACT

A multilayer ceramic electronic component includes a body including a dielectric layer and an internal electrode, and an external electrode disposed on the exterior of the body. The dielectric layer includes a plurality of dielectric grains and a grain boundary present between the dielectric grains. A molar ratio (Al/Ti) of Al and Ti included in the grain boundary satisfies 0.022 to 0.028.

20 Claims, 4 Drawing Sheets

(56) References Cited

U.S. PATENT DOCUMENTS

| | | | |
|---|---|---|---|
| 2020/0051748 A1* | 2/2020 | Park | ................... H01G 4/1227 |
| 2020/0243262 A1* | 7/2020 | Kwak | ................... H01G 4/228 |
| 2020/0265996 A1 | 8/2020 | Kim et al. | |
| 2021/0249192 A1 | 8/2021 | Kang et al. | |

FOREIGN PATENT DOCUMENTS

| | | |
|---|---|---|
| KR | 10-2019-0121134 A | 10/2019 |
| KR | 10-2019-0121236 A | 10/2019 |
| KR | 10-2020-0133410 A | 11/2020 |
| KR | 10-2021-0100952 A | 8/2021 |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2021-0188004 filed on Dec. 27, 2021 in the Korean Intellectual Property Office, the disclosure of which is incorporated herein by reference in its entirety.

BACKGROUND

1. Technical Field

The present disclosure relates to a multilayer ceramic electronic component.

2. Description of Related Art

In general, electronic components using ceramic materials such as capacitors, inductors, piezoelectric elements, varistors or thermistors include a ceramic body formed of a ceramic material, an internal electrode formed inside the body, and an external electrode disposed on a surface of the ceramic body to be connected to the internal electrode.

Recently, as electronic products are miniaturized and multifunctionalized, chip components have also miniaturized and multifunctionalized. Therefore, a multilayer ceramic capacitor (MLCCs), a multilayer electronic component, are also required to have a reduced size and implement high capacitance.

A method for achieving miniaturization and implementation of high capacitance of a multilayer ceramic capacitor at the same time includes reducing thicknesses of an dielectric layer and an internal electrode layer to stack a large number of layers. A dielectric layer having a current thickness of about 0.6 μm has been continuously developed to have a reduced thickness. As described above, it is difficult to secure reliability due to miniaturization of multilayer ceramic capacitors. In order to address such an issue, research into dielectric composition has been conducted.

In the related art, various oxides and/or carbonate sub-ingredients have been added to a main ingredient such as barium titanate so as to improve the withstand voltage and reliability of a multilayer ceramic capacitor. However, in order for the sub-ingredients to contribute to the electrical properties of the multilayer ceramic capacitor, the sub-ingredients need to be ionized and dissolved in dielectric grains including the main ingredient. However, an ionization process requires a large amount of energy. When the energy is not sufficient, the sub-ingredients are segregated in a grain boundary between the dielectric grains.

Therefore, there is a need for research into a method for improving reliability of multilayer ceramic capacitors by adding a certain level of sub-ingredient, dissolving the sub-ingredient in dielectric grains, and controlling a content of the sub-ingredient segregated in a grain boundary.

SUMMARY

An aspect of the present disclosure provides a ceramic electronic component having excellent withstand voltage properties.

Another aspect of the present disclosure provides a ceramic electronic component having excellent reliability.

However, the aspects of the present disclosure are not limited to the above, and will be more easily understood in the process of describing specific example embodiments of the present disclosure.

According to an aspect of the present disclosure, there is provided a multilayer ceramic electronic component including a body having a dielectric layer and an internal electrode, and an external electrode disposed on the exterior of the body. The dielectric layer may include a plurality of dielectric grains and a grain boundary present between the dielectric grains, and a molar ratio (Al/Ti) of Al and Ti included in the grain boundary may satisfy 0.022 to 0.028.

According to another aspect of the present disclosure, there is provided a multilayer ceramic electronic component including a body having a dielectric layer and an internal electrode, and an external electrode disposed on the exterior of the body. The dielectric layer may include dielectric grains having a core-shell structure and a grain boundary present between the dielectric grains. Rg/Rs may be 0.953 or less, when a molar ratio (Al/Ti) of Al and Ti included in the grain boundary is Rg, and a molar ratio (Al/Ti) of Al and Ti included in a shell is Rs.

According to example embodiments of the present disclosure, a ceramic electronic component may have excellent withstand voltage properties, even when a dielectric layer is thinned.

According to example embodiments of the present disclosure, a ceramic electronic component may have excellent reliability, even when a dielectric layer is thinned.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
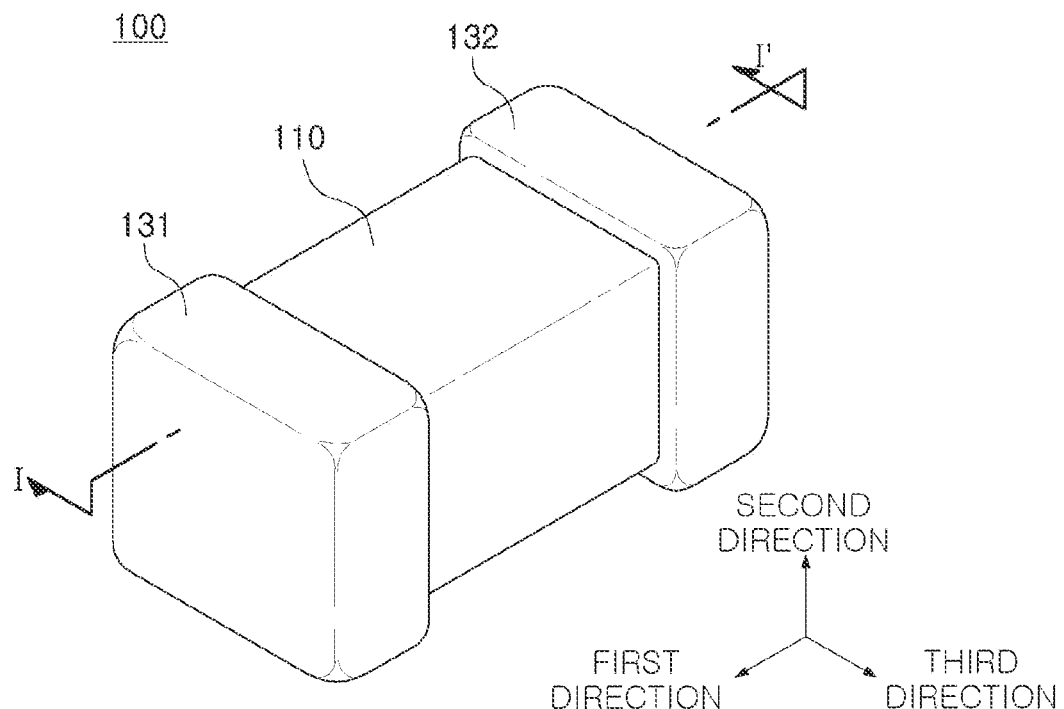
FIG. 1 is a schematic perspective view of a ceramic electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is represented by as "comprising" or "including," it means that it may include other elements as well, rather than excluding other elements, unless specifically stated otherwise.

In the drawings, a first direction may be defined as a length (L) direction, a second direction may be defined as a thickness (T) direction, and a third direction may be defined as a width (W) direction.

FIG. 1 is a schematic perspective view of a ceramic electronic component according to an example embodiment of the present disclosure.

Figure 2:
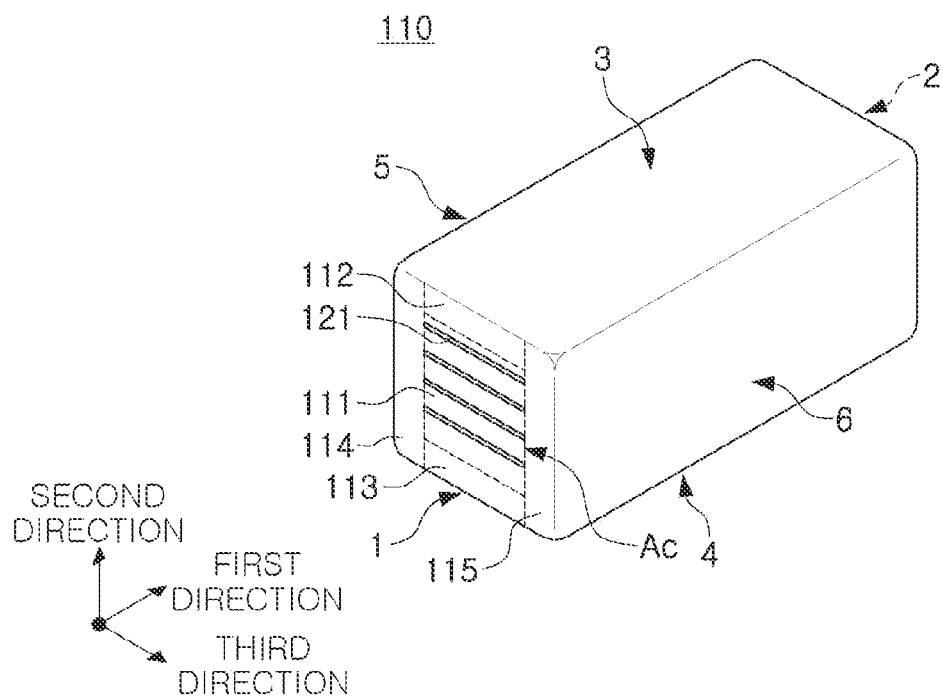
FIG. 2 is a schematic perspective view of a body of the multilayer ceramic electronic component of FIG. 1.

FIG. 2 is a schematic perspective view of a body of the multilayer ceramic electronic component of FIG. 1.

Figure 3:
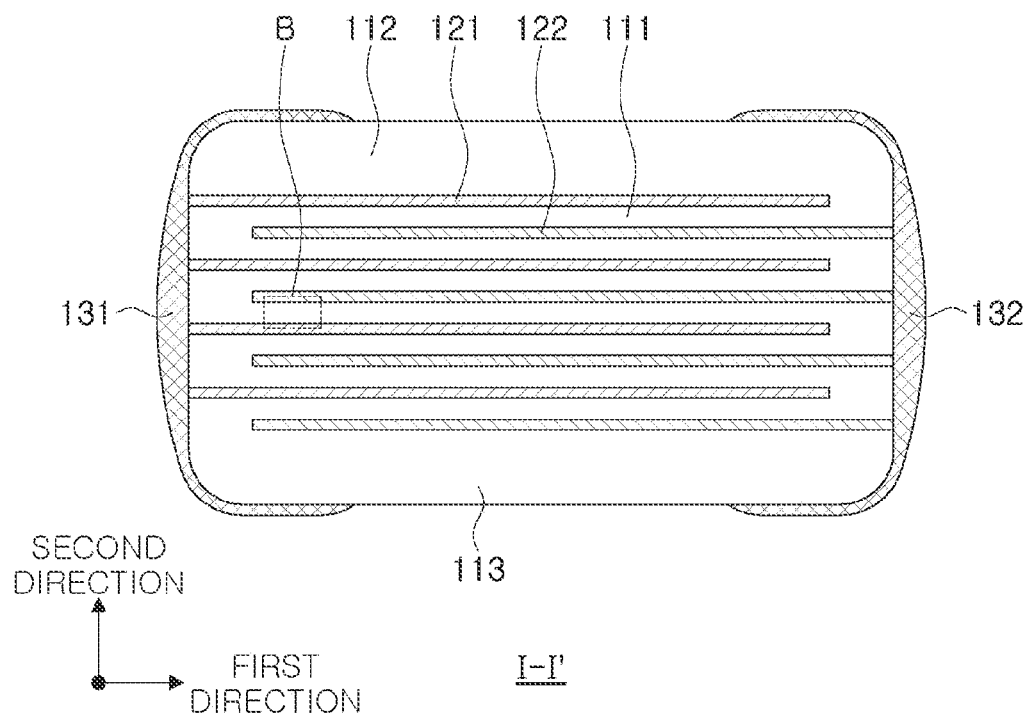
FIG. 3 is a schematic cross-sectional view taken along line I-I' of FIG. 1.

FIG. 3 is a schematic cross-sectional view taken along line I-I' of FIG. 1.

Figure 4:
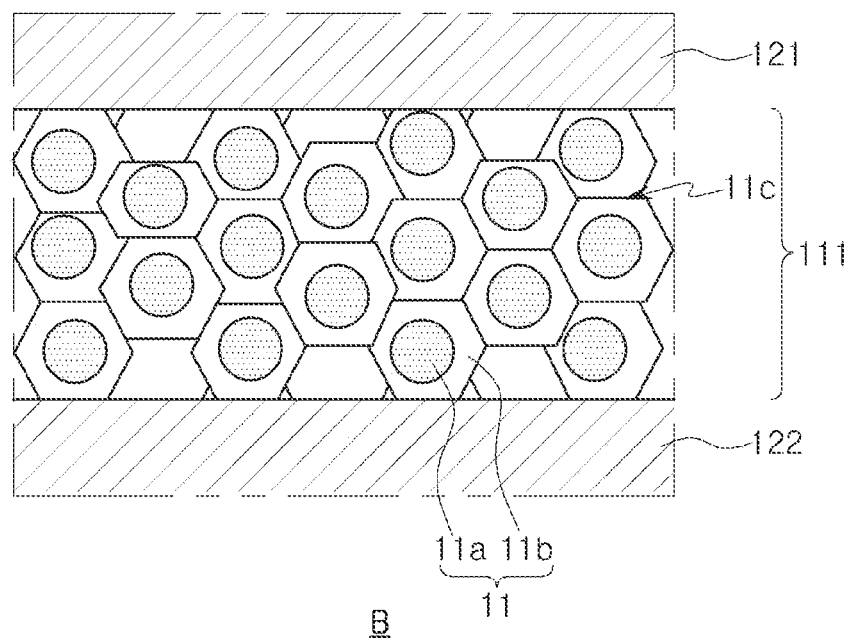
FIG. 4 is an enlarged view of region B of FIG. 3.

FIG. 4 is an enlarged view of region B of FIG. 3.

Hereinafter, a ceramic electronic component 100 according to an example embodiment of the present disclosure will be described in detail with reference to FIGS. 1 to 4. In addition, a multilayer ceramic capacitor will be described as an example of a ceramic electronic component, but the present disclosure is not limited thereto, and may also be applied to various ceramic electronic components using a ceramic material, for example, an inductor, a piezoelectric element, a varistor, or a thermistor.

An example embodiment of the present disclosure, there is provided a multilayer ceramic electronic component 100 including a body 110 including a dielectric layer 111 and internal electrodes 121 and 122, and external electrodes 131 and 132 disposed on the exterior of the body 110. The dielectric layer 111 may include a plurality of dielectric grains 11 and a grain boundary 11c present between the dielectric grains 11, and a molar ratio (Al/Ti) of Al and Ti included in the grain boundary 11c may satisfy 0.022 to 0.028.

A specific shape of the body 110 is not particularly limited. However, as illustrated, the body 110 may have a hexahedral shape or a shape similar thereto. During a sintering process, due to shrinkage of ceramic powder particles included in the body 110 or grinding of an edge portion, the body 110 may not have a perfectly straight hexahedral shape, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

In the body 110, the dielectric layer 111 and the internal electrodes 121 and 122 may be alternately stacked. A plurality of dielectric layers 111 forming the body 110 may be in a sintered state, and the adjacent dielectric layers 111 may be integrated with each other so that boundaries therebetween are not readily apparent without using a scanning electron microscope (SEM).

The body 110 may include a capacitance formation portion Ac disposed in the body 110, and including a plurality of first internal electrodes 121 and a plurality of second internal electrodes 122 opposing each other with the dielectric layer 111 interposed therebetween to form capacitance, and a first cover portion 112 and a second cover portion 113 respectively formed on upper and lower portions of the capacitance formation portion Ac.

The first cover portion 112 and the second cover portion 113 may be formed by stacking a single dielectric layer or two or more dielectric layers on upper and lower surfaces of the capacitance formation portion Ac in the second direction, respectively, and may basically serve to prevent damage to an internal electrode caused by physical or chemical stress. Each of the first and second cover portions 112 and 113 may have a thickness of 20 μm or less, but the present disclosure is not limited thereto.

The body 110 may further include margin portions 114 and 115 disposed on side surfaces of the capacity formation portion Ac in the third direction. The margin portions 114 and 115 may include a first margin 114 disposed on the fifth surface 5 of the body 110 and a second margin portion 115 disposed on the sixth surface 6 of the body 110. The margin portions 114 and 115 may basically serve to prevent damage to the internal electrodes 121 and 122 caused by physical or chemical stress.

The margin portions 114 and 115 may be formed by forming an internal electrode by applying a conductive paste on a ceramic green sheet except a portion in which a margin portion is to be formed. In addition, in order to suppress a step caused by the internal electrodes 121 and 122, after stacking, the internal electrodes 121 and 122 may be cut to be exposed to the fifth and sixth surfaces 5 and 6 of the body, and then a single dielectric layer or two or more dielectric layers may be stacked on opposite side surfaces of the capacitance formation portion Ac in the third direction, thereby forming the margin portions 114 and 115. A thickness of each of the margin portions 114 and 115 may be 20 μm or less, but the present disclosure is not limited thereto.

The internal electrodes 121 and 122 may be alternately disposed with the dielectric layer 111, and the plurality of first internal electrodes 121 and the plurality of second internal electrodes 122 may oppose each other with the dielectric layer 111 interposed therebetween. That is, the first and second internal electrodes 121 and 122, a pair of electrodes having different polarities, may be formed to be alternately exposed through the first and second surfaces 1 and 2 of the body 110 in a stacking direction of the dielectric layer 111. The plurality of first internal electrodes 121 and the plurality of second internal electrodes 122 may be electrically isolated from each other by the dielectric layer 111 interposed therebetween.

A conductive metal included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by printing a conductive paste for internal electrodes including a conductive metal to a predetermined thickness on a ceramic green sheet, and then performing sintering thereon. A method for printing the conductive paste may include a screen-printing method, a gravure-printing method, or the like, but the present disclosure is not limited thereto The external electrodes 131 and 132 may be disposed on the first and second surfaces 1 and 2 of the body 110 to partially extend to the third surface, the fourth surface, the fifth surface, and the sixth surface 3, 4, 5, and 6, respectively. The external electrodes 131 and 132 may include a first external electrode 131 disposed on the first surface 1 of the body 110 to be connected to the plurality of first internal electrodes 121, and a second external electrode 132 disposed on the second surface 2 of the body 110 to be connected to the plurality of second internal electrodes 122.

The external electrodes 131 and 132 may be formed of any material as long as it has electrical conductivity, such as a metal, may be determined to include a specific material in consideration of electrical properties and structural stability, and may further have a multilayer structure. For example, the external electrodes 131 and 132 may include a conductive metal, and the conductive metal included in the external electrodes 131 and 132 may include copper (Cu), nickel (Ni), palladium (Pd), platinum (Pt), gold (Au), silver (Ag), lead (Pb), and/or an alloy including the same, but the present disclosure is not limited thereto.

The external electrodes 131 and 132 may be formed by dipping the first and second surfaces 1 and 2 of the body 110 into a conductive paste for external electrodes including a conductive metal and glass, and then performing sintering thereon. Alternatively, the external electrodes 131 and 132 may be formed by transferring a sheet including a conductive metal and glass.

The dielectric layer 111 may include a plurality of dielectric grains 11, and may include a grain boundary 11c present between the dielectric grains 11. A raw material for forming the dielectric layer 111 is not particularly limited as long as sufficient capacitance is obtainable therewith. For example, barium titanate ($BaTiO_3$) powder may be included. The dielectric layer 111 may be formed by sintering a ceramic green sheet including ceramic powder, an organic solvent, and a binder.

The dielectric grain 11 may include a main ingredient having a perovskite structure indicated by $ABO_3$. "A" may include one or more selected from the group consisting of barium (Ba), strontium (Sr), lead (Pb), and calcium (Ca), but the present disclosure is not limited thereto. "B" may include, for example, one or more selected from the group consisting of titanium (Ti) and zirconium (Zr), but the present disclosure is not limited thereto.

For example, the dielectric grain 11 may include one or more selected from the group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), and $Ba_m(Ti_{1-x}Zr_x)O_3$ ($0.995 \leq m \leq 1.010$, $x \leq 0.10$), or $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), and $Ba_m(Ti_{1-x}Zr_x)O_3$ ($0.995 \leq m \leq 1.010$, $x \leq 0.10$) in which one or more of a rare earth elements are partially dissolved, but the present disclosure is not limited thereto.

An average grain size of the dielectric grain 11 is not particularly limited, but may be, for example, 50 to 500 nm. When the average grain size is less than 50 nm, there is a risk that an expected effect may be insufficiently realized due to lack of solid solution of additional elements caused by a decrease in dielectric constant and a decrease in grain growth rate. When the average grain size is greater than 500 nm, there is a concern that a capacitance change rate according to temperature and DC voltage may increase, and reliability may be lowered due to a decrease in the number of dielectric grains per dielectric layer 111. The average grain size of the dielectric grain 11 may be measured by various methods such as a diameter measurement method or an ASTM grain size test method. Other methods and/or tools appreciated by one of ordinary skill in the art, even if not described in the present disclosure, may also be used.

According to an example embodiment of the present disclosure, the dielectric layer 111 may include a reduction-resistant dielectric composition which is sinterable in a reducing atmosphere. Hereinafter, respective components of the dielectric composition forming the dielectric layer 111 including the dielectric grain 11 will be described in more detail.

1) Main Ingredient

The dielectric composition may include, as a main ingredient, one of $BaTiO_3$, $(Ba,Ca)(Ti,Ca)O_3$, $(Ba,Ca)(Ti,Zr)O_3$, $Ba(Ti,Zr)O3$, and $(Ba,Ca)(Ti,Sn)O_3$.

For a more specific example, the dielectric composition may be one or more selected from the group consisting of $BaTiO_3$, $(Ba_{1-x}Ca_x)(Ti_{1-y}Ca_y)O_3$ (where x is $0 \leq x \leq 0.3$, and y is $0 \leq y \leq 0.1$), $(Ba_{1-x}Ca_x)(Ti_{1-y}Zr_y)O_3$ (where x is $0 \leq x \leq 0.3$, and y is $0 \leq y \leq 0.5$), $Ba(Ti_{1-y}Zr_y)O_3$ (where $0 < y \leq 0.5$), and $(Ba_{1-x}Ca_x)(Ti_{1-y}Sn_y)O_3$ (where x is $0 \leq x \leq 0.3$, and y is $0 \leq y \leq 0.1$).

2) First Sub-Ingredient

The dielectric composition may include a first sub-ingredient including a rare earth element. In this case, the rare earth element may include, for example, one or more of Y, Ac, Ce, Pr, Nd, Pm, Sm, Eu, Gd, Tb, Dy, Ho, Er, Tm, Yb, La, and Lu.

The first sub-ingredient may serve as a donor by substituting an A-site of an $ABO_3$ structure, and thus oxygen vacancy concentration may be reduced, thereby improving reliability. In addition, the rare earth element may serve as a barrier to block flow of electrons at a grain boundary, thereby suppressing an increase in leakage current.

In this case, the first sub-ingredient may include 0.2 mol or more and 4.0 mol or less of an oxide or carbonate including the rare earth element, relative to 100 mol of the main ingredient. When a content of the oxide or carbonate including the rare earth element is less than 0.2 mol relative to 100 mol of the main ingredient, the above-described effect may be insufficient. When the content of the oxide or carbonate including the rare earth element is more than 4.0 moles relative to 100 moles of the main ingredient, the characteristics of the insulator and sinterability may decrease due to semiconductorization.

3) Second Sub-Ingredient

The dielectric composition may include a second sub-ingredient including one or more of a variable-valence acceptor element and a fixed-valence acceptor element. The variable-valence acceptor element and the fixed-valence acceptor element may be mainly substituted for a B-site of the $ABO_3$ structure to serve as an acceptor, and serve to reduce electron concentration. Accordingly, the variable-valence acceptor element and the fixed-valence acceptor element may serve to suppress semiconductorization of the dielectric layer caused by A-site solid solution of the rare earth element. In addition, the variable-valence acceptor element and the fixed-valence acceptor element may serve to lower a sintering temperature and improve high-temperature withstand voltage properties of a multilayer ceramic capacitor to which the dielectric composition is applied.

In this case, the variable-valence acceptor may include one or more of Mn, V, Cr, Fe, Ni, Co, Cu, and Zn, and the fixed-valence acceptor may include Mg. In addition, the second sub-ingredient may include 0.01 mol or more and 4.0 mol or less of an oxide or carbonate including one or more of the variable-valence acceptor element and the fixed-valence acceptor element relative to 100 moles of the main ingredient.

When the content of oxide or carbonate including one or more of the variable-valence acceptor element and the fixed-valence acceptor element is less than 0.01 mole relative to 100 moles of the main ingredient, there is a concern that it may be difficult to suppress semiconductorization of the dielectric layer by addition of the rare earth element, sintering temperature may be increased, and high-temperature withstand voltage properties may be slightly lowered. When the content of the oxide or carbonate including one or more of the variable-valence acceptor element and the fixed-valence acceptor element is greater than 4.0 moles relative to 100 moles of the main ingredient, breakdown voltage (BDV) or room-temperature resistivity may be reduced.

4) Third Sub-Ingredient

The dielectric composition may include a third sub-ingredient that is an oxide or carbonate including Ba, and a content of the third sub-ingredient may be 0.37 moles or more and 4.0 moles or less relative to 100 moles of the main ingredient.

The content of the third sub-ingredient may be based on a content of a Ba element included in the third sub-ingredient, regardless of a type of additive such as an oxide or carbonate. The third sub-ingredient may serve to promote sintering and control a dielectric constant in a dielectric ceramic composition. When the content of the third sub-ingredient is less than 0.37 mol relative to 100 mol of the main ingredient, an effect thereof may be insufficient. When the content of the third sub-ingredient is greater than 4.0 mol relative to 100 mol of the main ingredient, a dielectric constant may be lowered or sintering temperature may be increased.

5) Fourth Sub-Ingredient

The dielectric composition may include a fourth sub-ingredient that is an oxide or carbonate including one or more of Ca, Ti, and Zr. In this case, a content of the fourth sub-ingredient may be 24 moles or less relative to 100 moles of the main ingredient.

The fourth sub-ingredient may form a core-shell structure in the dielectric composition to improve a dielectric constant and enhance reliability. When the content of the fourth sub-ingredient is greater than 24 moles relative to 100 moles of the main ingredient, a room-temperature dielectric constant and high-temperature withstand voltage properties may be lowered.

6) Fifth Sub-Ingredient

The dielectric composition may include an oxide including at least one of Si and Al. The fifth sub-ingredient may serve to lower sintering temperature and improve high-temperature withstand voltage properties of a multilayer ceramic electronic component to which the dielectric composition is applied. In addition, as described below, Al may be coated on a surface of ceramic powder forming the dielectric layer 111, and thus may be included in the dielectric layer 111.

A multilayer ceramic capacitor, one of the multilayer ceramic electronic components 100, tends to have high capacitance and an ultra-thin layer. With increasing capacitance and thinning, securing withstand voltage properties and reliability of the dielectric layer 111 in the multilayer ceramic capacitor has emerged as a major issue. In order to resolve such issues, in the related art, the above-described sub-ingredient, particularly, an oxide including Al was added to the dielectric layer 111 to improve the withstand voltage properties of the multilayer ceramic capacitor.

However, in order for the oxide including Al to contribute to electrical properties of the multilayer ceramic capacitor, Al may need to be ionized and dissolved in the dielectric grain 11 including the main ingredient. However, Al may require a large amount of energy in an ionization process. When the energy is not sufficient, Al may be segregated in the grain boundary 11c present between the dielectric grains 11. In addition, when an oxide including Al is excessively added to dissolve Al in the dielectric grain 11, a dielectric constant of the dielectric layer 111 may be lowered, and a DC bias change rate may be increased. Accordingly, it may be necessary to reduce a content of Al in the grain boundary 11c by dissolving Al in the dielectric grain 11 while adding the same amount of Al.

Accordingly, according to an example embodiment of the present disclosure, a molar ratio (Al/Ti) of Al and Ti included in the grain boundary 11c may satisfy 0.022 to 0.028. That is, Al may be effectively dissolved in the dielectric grain 11 by controlling the content of Al included in the grain boundary 11c. Accordingly, leakage current of the multilayer ceramic electronic component 100 may be effectively suppressed. In addition, excellent dielectric breakdown voltage properties may be implemented, thereby improving withstand voltage properties and reliability of the multilayer ceramic electronic component 100.

When the molar ratio (Al/Ti) of Al and Ti included in the grain boundary 11c is less than 0.022, insulation resistance of the grain boundary 11c may be reduced, thereby reducing the withstand voltage properties and reliability of the multilayer ceramic electronic component 100.

When the molar ratio (Al/Ti) of Al and Ti included in the grain boundary 11c is greater than 0.028, the content of Al included in the grain boundary 11c may be too high, such that the DC bias change rate may be increased, and the dielectric constant of the multilayer ceramic electronic component 100 may be reduced.

As an example of a method of adjusting the content of Al included in the grain boundary 11c, the dielectric layer 111 may be formed of ceramic powder such as $BaTiO_3$ or the like coated with ionized Al, thereby adjusting the content of Al included in the grain boundary 11c.

In this case, in a method of coating Al on $BaTiO_3$ powder may include, for example, coating Al by adding an additive coating solution including a rare earth element and Al included in the sub-ingredient, when $BaTiO_3$ is prepared by hydrothermal synthesis. In this case, the rare earth element may serve as a donor, and Al may serve as an acceptor. Accordingly, Al may be ionized and the ionized Al may be coated on a surface of the $BaTiO_3$ powder. As a result, energy for Al to be dissolved in the dielectric grain 11 may be lowered, such that Al may be easily dissolved in the dielectric grain 11, thereby reducing the content of Al included in the grain boundary 11c.

A method of adjusting a content of Ti included in the grain boundary 11c may include, for example, adjusting the content of Ti by adding $TiO_2$ to the dielectric layer 111, but the present disclosure is not limited thereto.

In an example embodiment of the present disclosure, the dielectric grain 11 may have a core-shell structure. That is, the dielectric grain 11 may have a structure of a core 11a and a shell 11b surrounding the core 11a. In the core 11a, Al may not be present or a small amount of Al may be present even when Al is present. Accordingly, a molar ratio (Al/Ti) of Al and Ti included in the core 11a and a molar ratio (Al/Ti) of Al and Ti included in the shell 11b may rapidly change at a boundary between the core 11a and the shell 11b, such that the core 11a and the shell 11b may be easily distinguished from each other, which may be confirmed through transmission electron microscope-energy dispersive X-ray spectroscopy (TEM-EDS) analysis. Other methods and/or tools appreciated by one of ordinary skill in the art, even if not described in the present disclosure, may also be used.

In this case, when the molar ratio (Al/Ti) of Al and Ti included in the grain boundary 11c is Rg, and the molar ratio (Al/Ti) of Al and Ti included in the shell 11b is Rs, Rg/Rs may be 0.953 or less. When Rg/Rs is 0.953 or less, the withstand voltage properties and reliability of the multilayer ceramic electronic component 100 may be improved. Satisfying the above-described range may mean that the content of Al segregated in the grain boundary 11c is reduced and a sufficient amount of Al is dissolved in the shell 11b. Thus, the withstand voltage properties and reliability of the multilayer ceramic electronic component 100 may be improved. A lower limit of Rg/Rs is not particularly limited, and may be greater than zero.

In an example embodiment of the present disclosure, an average thickness of the grain boundary 11c may be 0.7 to 1.5 nm. When the average thickness of the grain boundary 11c satisfies 0.7 to 1.5 nm, insulation resistance of the grain boundary 11c may be enhanced, thereby improving the reliability of the multilayer ceramic electronic component 100. When the average thickness of the grain boundary 11c is less than 0.7 nm, the insulation resistance may be lowered, thereby lowering the reliability. When the average thickness of the grain boundary 11c is greater than 1.5 nm, a dielectric constant may be lowered.

The average thickness of the grain boundary 11c may be measured from an image obtained by analyzing the dielectric layer 111 through TEM in cross-sections of the multilayer ceramic electronic component 100 in a first direction and a second direction. More specifically, the average value may be measured by measuring a thickness thereof at multiple points of the grain boundary 11c, for example, at any thirty points. Other methods and/or tools appreciated by one of ordinary skill in the art, even if not described in the present disclosure, may also be used.

In an example embodiment of the present disclosure, an average thickness of the dielectric layer 111 may be 0.1 to 10 μm, and may be 0.4 μm or less for miniaturization and implementation of high capacitance of the multilayer ceramic electronic component 100, but the present disclosure is not limited thereto. The average thickness of the dielectric layer 111 may be measured by scanning, with an SEM, cross-sections of the body 110 in the first and second directions at a magnification of 10,000. More specifically, the average value may be measured by measuring a thickness thereof at multiple points of one dielectric layer 111, for example, at thirty points equally spaced apart from each other in the first direction. In addition, when such average value measurement is performed on the plurality of dielectric layers 111, the average thickness of the dielectric layer 111 may be further generalized. Other methods and/or tools appreciated by one of ordinary skill in the art, even if not described in the present disclosure, may also be used.

In an example embodiment of the present disclosure, an average thickness of the internal electrodes 121 and 122 may be 0.2 to 1.0 μm, and may be 0.4 μm or less for miniaturization and implementation of high capacitance of the multilayer ceramic electronic component 100, but the present disclosure is not limited thereto. The average thickness of the internal electrodes 121 and 122 may be measured by scanning, with an SEM, cross-sections of the body 110 in the first direction and the second direction at a magnification of 10,000. More specifically, the average value may be measured by measuring a thickness thereof at multiple points of one internal electrode, for example, thirty points equally spaced apart from each other in the first direction. When such average value measurement is performed on a plurality of internal electrodes, the average thickness of the internal electrodes may be further generalized. Other methods and/or tools appreciated by one of ordinary skill in the art, even if not described in the present disclosure, may also be used.

According to another example embodiment of the present disclosure, there is provided a multilayer ceramic electronic component including a body 110 including a dielectric layer 111 and internal electrodes 121 and 122, and external electrodes 131 and 132 disposed the exterior of the body 110. The dielectric layer 111 may include dielectric grains 11 having a core 11a-shell 11b structure and a grain boundary 11c present between the dielectric grains 11. When a molar ratio (Al/Ti) of Al and Ti included in the grain boundary 11c is Rg, and a molar ratio (Al/Ti) of Al and Ti included in the shell 11b is Rs, Rg/Rs may be 0.953 or less.

The dielectric grain 11 may have a structure of a core 11a and a shell 11b surrounding the core 11a. In the core 11a, Al may not be present or a small amount of Al may be present even when Al is present. Accordingly, a molar ratio (Al/Ti) of Al and Ti included in the core 11a and a molar ratio (Al/Ti) of Al and Ti included in the shell 11b may rapidly change at a boundary between the core 11a and the shell 11b, such that the core 11a and the shell 11b may be easily distinguished from each other, which may be confirmed through TEM-EDS analysis. Other methods and/or tools appreciated by one of ordinary skill in the art, even if not described in the present disclosure, may also be used.

In this case, Ra/Rs may be 0.953 or less. When Ra/Rs is 0.953 or less, withstand voltage properties and reliability of the multilayer ceramic electronic component 100 may be improved. Satisfying the above-described range may mean that a content of Al segregated in the grain boundary 11c is reduced and a sufficient amount of Al is dissolved in the shell 11b. the withstand voltage properties and reliability of the multilayer ceramic electronic component 100 may be improved. A lower limit of Rg/Rs is not particularly limited, and may be greater than zero.

The multilayer ceramic electronic component 100 according to another example embodiment of the present disclosure may have a configuration the same as that of the above-described multilayer ceramic electronic component 100 according to an example embodiment of the present disclosure. Accordingly, descriptions overlapping those of an example embodiment of the present disclosure will be omitted.

EXAMPLES

Hereinafter, the present disclosure will be described in more detail through Examples and Comparative Examples. The Examples are merely intended to assist in specific understanding of the present disclosure, and the scope of the present disclosure is not limited by the Examples.

First, a preparation method according to an Example of the present disclosure will be described. First, barium titanate ($BaTiO_3$) powder, a main component, was prepared. In this case, the barium titanate ($BaTiO_3$) powder was prepared by hydrothermal synthesis, and an additive coating solution including Dy included in a first sub-ingredient and Al was added. More specifically, a nitric acid ($HNO_3$) solution including Dy and an aluminum nitrate solution were mixed, and then a mixture thereof was added to a BT slurry including grain-grown barium titanate ($BaTiO_3$) particles. Thereafter, the BT slurry was dried to form barium titanate ($BaTiO_3$) powder. In addition, first to fourth sub-ingredients were added in the form of an oxide or carbonate, and then a binder, an organic solvent, and the like were added and mixed to prepare a ceramic slurry.

The prepared ceramic slurry was coated on a carrier film in the form of a sheet having a thickness of several μm by a doctor blade method, and then was dried to prepare a ceramic green sheet.

Next, a conductive paste for internal electrodes having an average nickel particle size of 0.1 to 0.2 μm and including 40 to 50 parts by weight of nickel powder was prepared.

An internal electrode was formed by applying the conductive paste for internal electrodes onto the green sheet by a screen-printing method, and then the green sheet on which an internal electrode pattern is formed was stacked to form a stack having a thickness of about 0.3 mm, and then the stack was compressed and cut to have a size of 0603 (length×width, 0.6 mm×0.3 mm).

Thereafter, the cut stack was heated in a nitrogen atmosphere at 400° C. or lower to remove the binder, and then was sintered at a sintering temperature of 1200° C. or lower and a hydrogen concentration of 0.5% $H_2$ or lower to prepare a body including a dielectric layer and an internal electrode. Next, with respect to the sintered body, an external electrode was formed through a termination process and electrode sintering with copper (Cu) paste, thereby completing sample chips of Sample Nos. 4 to 6.

In a Comparative Example, a binder, an organic solvent, and the like was added to barium titanate ($BaTiO_3$) powder, and then mixed to form a ceramic slurry in the same manner as the related art. In this case, unlike the Example, Al was added in the form of an oxide. Thereafter, except that Al was added in the form of an oxide, the Comparative Example was prepared in the same manner as the example, thereby completing sample chips of Sample Nos. 1* to 3* and Sample Nos. 7* to 9*.

With respect to Sample Nos. 1 to 9, specimens of the sample chips completed as described above, a molar ratio (Al/Ti) of Al and Ti included in the grain boundary, an Rg/Ra ratio (where Rg is a molar ratio of Al and Ti included in the grain boundary, and Rs is a molar ratio of Al and Ti included in a shell), and a breakdown voltage were measured, and a failure rate was evaluated by performing a highly accelerated life test (HALT). Results thereof are indicated in Table 1 below.

A molar ratio (Rg) of Al and Ti included in the grain boundary and a molar ratio (Rs) of Al and Ti included in the shell were measured by performing TEM-EDS analysis on each sample. More specifically, cross-sections in a first direction and a second direction cut from a central portion in a third direction of ten sample chips for each sample number were analyzed using TEM and EDS devices, and an average value of values measured at any three points for each sample was calculated.

A breakdown voltage (BDV) was measured with a Keithely measuring instrument. A voltage from 0 V to 1.00000 V was applied in a sweep manner to measure, as a BDV value, a voltage value when a current value reached 20 mA. When an average value of BDVs measured with respect to forty samples was 80V or more, a sample chip was determined as good (○) When the average value was 70V or more and less than 80V, the sample chip was determined as normal (Δ) When the average value was less than 70V, the sample chip was determined as bad (X).

For the HALT, eighty sample chips per each sample number were mounted on a substrate, and measured for 12 hours under an applying condition of 105° C. and 12.6V (DC). With respect to results of measurements, when a failure rate was 0%, a sample chip was determined as good (○). When failure rate was 10% or less, the sample chip was determined as normal (Δ) When the failure rate was more than 10%, the sample chip was determined as bad (X).

TABLE 1

| Sample Number | Al/Ti (Rg) | Rg/Rs | BDV Measurement | HALT Failure Rate |
|---|---|---|---|---|
| 1* | 0.013 | 0.996 | Δ | Δ |
| 2* | 0.014 | 1.215 | Δ | Δ |
| 3* | 0.019 | 0.964 | Δ | Δ |
| 4 | 0.022 | 0.953 | ○ | ○ |
| 5 | 0.024 | 0.562 | ○ | ○ |
| 6 | 0.028 | 0.682 | ○ | ○ |
| 7* | 0.042 | 3.020 | X | X |
| 8* | 0.047 | 2.361 | X | X |
| 9* | 0.049 | 3.051 | X | X |

*indicates the Comparative Example.

In Sample Nos. 1* to 3* in which a molar ratio (Al/Ti) of Al and Ti in a grain boundary is less than 0.022 and an Rg/Rs value is greater than 0.953, it can be seen that a BDV value was lowered and a HALT failure occurred. In addition, even in Sample Nos. 7* to 9* in which a molar ratio (Al/Ti) of Al to Ti in a grain boundary is greater than 0.028, it can be seen that a BDV value was lowered and a HALT failure rate was increased. In particular, in Sample Nos. 7* to 9*, it can be seen that leakage current was increased due to an excessively high Rg/Rs value, such that BDV and HALT properties were lowered than those of Sample Nos. 1* to 3*.

Sample Nos. 4 to 6 in which an Al/Ti value in a grain boundary satisfies 0.022 to 0.028 had excellent BDV values, and had no HALT failure. Thus, it can be seen that withstand voltage properties and reliability of a multilayer ceramic electronic component were improved by adjusting the Al/Ti value.

In addition, in Sample Nos. 4 to 6 in which the Rg/Rs value is 0.953 or less, it can be seen that the withstand voltage properties and reliability of the multilayer ceramic electronic component were improved due to a high ratio of Al dissolved in a shell as compared to Al segregated in the grain boundary. Conversely, in Sample Nos. 1* to 3* and 7* to 9* in which the Rg/Rs value is greater than 0.953, it can be seen that the withstand voltage properties and reliability were lowered.

Figure 5:
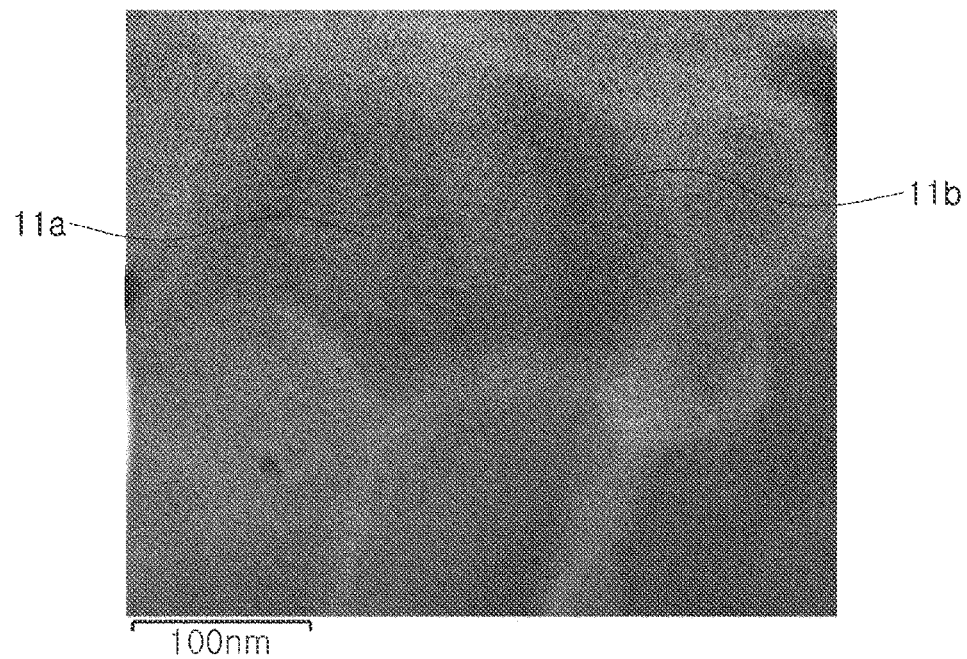
FIGS. 5 and 6 are transmission electron microscope (TEM) analysis images according to an Example of the present disclosure.
Figure 6:
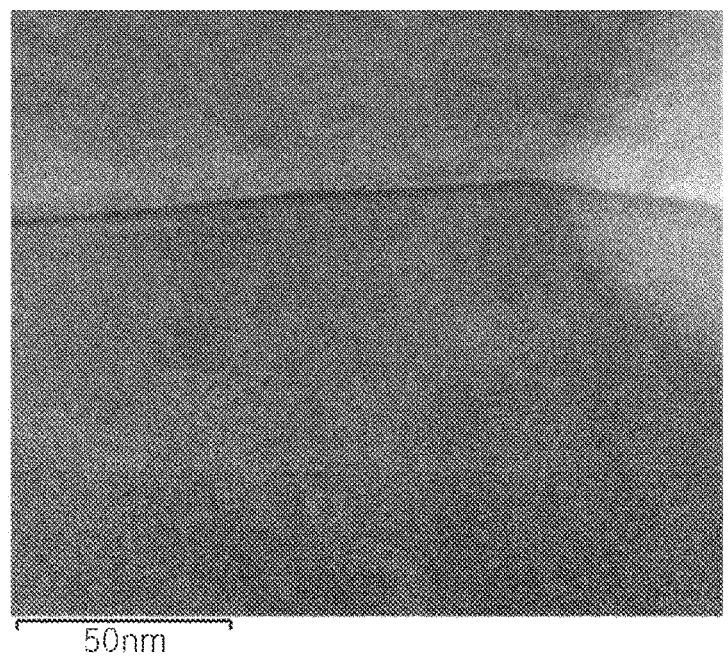

FIGS. 5 and 6 are TEM analysis images according to an Example of the present disclosure.

Figure 7:
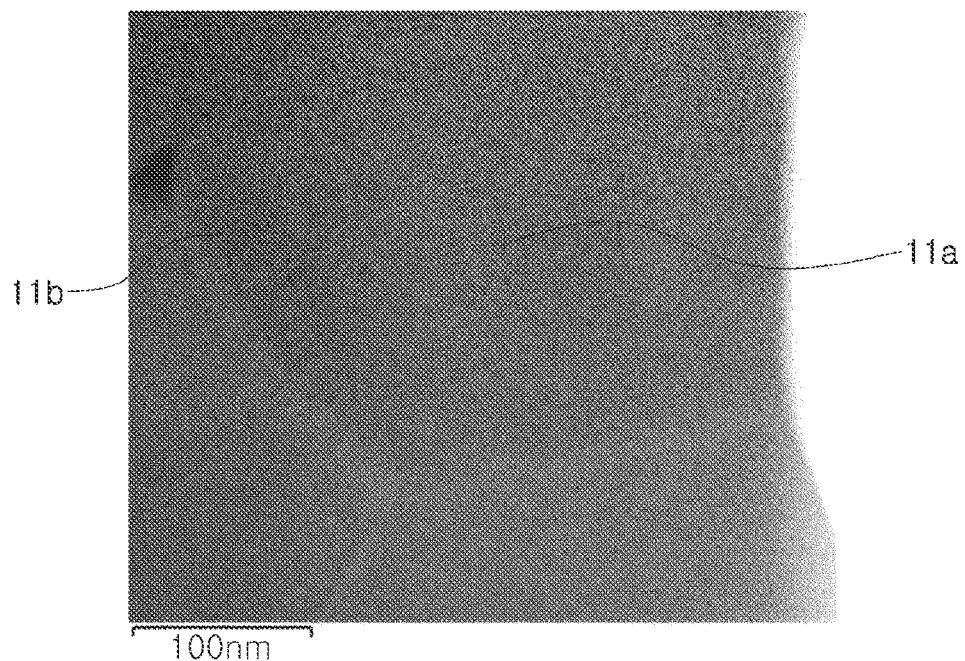
FIGS. 7 and 8 are TEM analysis images according to a Comparative Example of the present disclosure.
Figure 8:
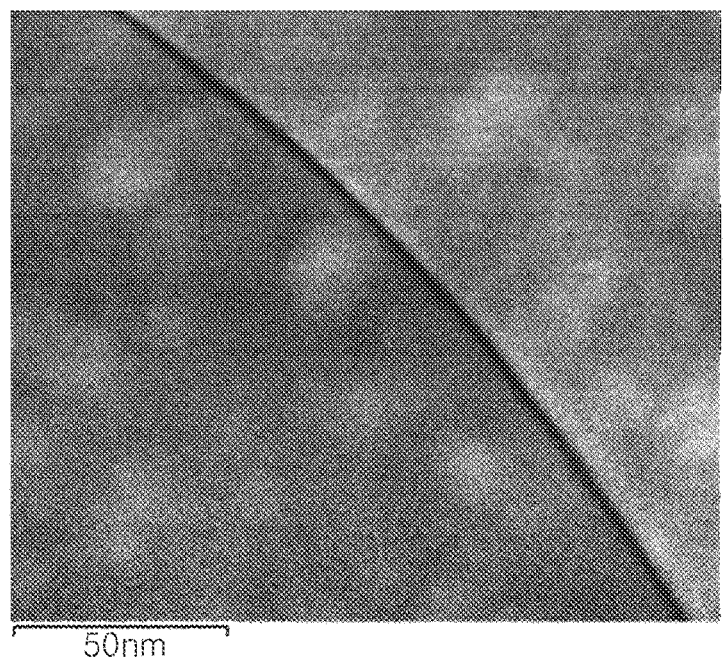

FIGS. 7 and 8 are TEM analysis images according to a Comparative Example of the present disclosure.

Referring to FIGS. 4 to 8, in the dielectric grain 11 according to the Example of the present disclosure, it can be seen that the core 11a and the shell 11b are clearly distinguished from each other as compared to that of the Comparative Example, thereby enhancing insulation resistance, from which, it can be seen that reliability is excellent.

While example embodiments have been shown and described above, it will be apparent to those skilled in the art that modifications and variations could be made without departing from the scope of the present disclosure as defined by the appended claims.

What is claimed is:

1. A multilayer ceramic electronic component comprising:
   a body including a dielectric layer and an internal electrode; and
   an external electrode disposed on the exterior of the body,
   wherein the dielectric layer includes a plurality of dielectric grains and a grain boundary present between the dielectric grains, and a molar ratio (Al/Ti) of Al and Ti included in the grain boundary satisfies 0.022 to 0.028.

2. The multilayer ceramic electronic component of claim 1, wherein the dielectric grains have a core-shell structure.

3. The multilayer ceramic electronic component of claim 2, wherein Rg/Rs is 0.953 or less, where Rg is the molar ratio (Al/Ti) of Al and Ti included in the grain boundary, and Rs is a molar ratio (Al/Ti) of Al and Ti included in a shell.

4. The multilayer ceramic electronic component of claim 1, wherein the dielectric grains include a main ingredient represented by $ABO_3$, where A is at least one of Ba, Sr, Pb, and Ca, and B is at least one of Ti and Zr.

5. The multilayer ceramic electronic component of claim 1, wherein the dielectric layer includes one or more of Y, Ac, Ce, Pr, Nd, Pm, Sm, Eu, Gd, Tb, Dy, Ho, Er, Tm, Yb, La, and Lu.

6. The multilayer ceramic electronic component of claim 1, wherein the dielectric layer includes one or more of Mn, V, Cr, Fe, Ni, Co, Cu, and Zn, and Mg.

7. The multilayer ceramic electronic component of claim 1, wherein the dielectric layer includes an oxide or carbonate including Ba.

8. The multilayer ceramic electronic component of claim 1, wherein the dielectric layer includes an oxide or carbonate including one or more of Ca, Ti, and Zr.

9. The multilayer ceramic electronic component of claim 1, wherein the dielectric grains have an average grain size of 50 to 500 nm.

10. The multilayer ceramic electronic component of claim 1, wherein the grain boundary has an average thickness of 0.7 to 1.5 nm.

11. The multilayer ceramic electronic component of claim 1, wherein the dielectric layer has an average thickness of 0.4 μm or less.

12. The multilayer ceramic electronic component of claim 1, wherein the dielectric grains include $BaTiO_3$ as a main ingredient.

13. The multilayer ceramic electronic component of claim 1, wherein the dielectric layer includes Dy.

14. A method for manufacturing the multilayer ceramic electronic component of claim 1, comprising:
preparing barium titanate ($BaTiO_3$) powder including mixing barium titanate ($BaTiO_3$) particles with a solution including Dy and aluminum nitrate.

15. The method of claim 14, wherein the preparing of the barium titanate ($BaTiO_3$) powder excludes mixing the barium titanate ($BaTiO_3$) particles with an oxide of aluminum.

16. The method of claim 14, further comprising applying the barium titanate ($BaTiO_3$) powder to a sheet.

17. The method of claim 16, further comprising sintering the sheet to form the dielectric layer.

18. A multilayer ceramic electronic component comprising:
a body including a dielectric layer and an internal electrode; and
an external electrode disposed on the exterior of the body,
wherein the dielectric layer includes dielectric grains having a core-shell structure and a grain boundary present between the dielectric grains, and
Rg/Rs is 0.953 or less, Rg is a molar ratio (Al/Ti) of Al and Ti included in the grain boundary, and Rs is a molar ratio (Al/Ti) of Al and Ti included in a shell.

19. The multilayer ceramic electronic component of claim 18, wherein the grain boundary has an average thickness of 0.7 to 1.5 nm.

20. The multilayer ceramic electronic component of claim 18, wherein the dielectric layer has an average thickness of 0.4 μm or less.

* * * * *